(12) United States Patent
Seever

(10) Patent No.: US 8,080,970 B2
(45) Date of Patent: Dec. 20, 2011

(54) SYSTEM AND APPARATUS FOR USE OF A 3-PHASE MOTOR IN A VEHICLE

(76) Inventor: Larry Seever, Sarona, WI (US)

( * ) Notice: Subject to any disclaimer, the term of this patent is extended or adjusted under 35 U.S.C. 154(b) by 282 days.

(21) Appl. No.: 12/537,623

(22) Filed: Aug. 7, 2009

(65) Prior Publication Data

US 2011/0031915 A1 Feb. 10, 2011

(51) Int. Cl.
*H02P 27/00* (2006.01)
*H02P 1/26* (2006.01)

(52) U.S. Cl. .................. 318/795; 318/720; 318/400.26; 361/16; 180/53.5; 180/60; 180/65.1; 180/65.21

(58) Field of Classification Search .................. 318/795, 318/720, 400.26; 361/16; 180/53.5, 60, 180/65.1, 65.21

See application file for complete search history.

(56) References Cited

U.S. PATENT DOCUMENTS

| | | | |
|---|---|---|---|
| 3,740,629 A * | 6/1973 | Kohlhagen | 318/400.42 |
| 4,780,619 A | 10/1988 | Campbell et al. | |
| 4,947,053 A | 8/1990 | Campbell et al. | |
| 5,357,181 A | 10/1994 | Mutoh et al. | |
| 5,481,168 A | 1/1996 | Mutoh et al. | |
| 5,570,279 A * | 10/1996 | Venkataramanan | 363/127 |
| 5,629,603 A | 5/1997 | Kinoshita | |
| 5,831,409 A | 11/1998 | Lindberg et al. | |
| 5,889,428 A | 3/1999 | Young | |
| 6,278,256 B1 | 8/2001 | Aoyama | |
| 6,333,620 B1 | 12/2001 | Schmitz et al. | |
| 6,469,469 B1 * | 10/2002 | Chambers et al. | 318/801 |
| 6,815,934 B2 * | 11/2004 | Colley | 322/47 |
| 2005/0127880 A1 * | 6/2005 | Colley | 322/7 |
| 2008/0169138 A1 | 7/2008 | Grand et al. | |

* cited by examiner

*Primary Examiner* — Walter Benson
*Assistant Examiner* — Erick Glass
(74) *Attorney, Agent, or Firm* — Clifford H. Kraft

(57) ABSTRACT

A system and apparatus that allows the use of a 3-phase AC motor in a vehicle by associating a series capacitor with each phase winding. The capacitor can be charged through the motor winding and then switched to discharge through the winding in a resonant oscillatory mode. The capacitor values can be chosen so that the winding and capacitor in series resonates at approximately 60 Hz. Oscillations in each phase can be staggered by around 120 degrees. The charging and discharging is controlled by electronic SPDT switches that switch around 300 VAC/500 VDC at around 15 amps for each phase. With an average DC current of 20 amps from a 48 volt battery pack (four 12 volt batteries connected in series) and 75% discharge of the capacitors, the present invention can run a 7.5 HP, 3-phase, 240 VAC motor for approximately 3.5 hours or longer. A simple oscillator circuit can drive the switches at the resonant frequency.

14 Claims, 3 Drawing Sheets

SYSTEM AND APPARATUS FOR USE OF A 3-PHASE MOTOR IN A VEHICLE

BACKGROUND

1. Field of the Invention

The present invention relates to using a 3-phase AC motor in a vehicle and more specifically to powering a 3-phase AC motor in a vehicle by charging a capacitor through the motor winding and then discharging the capacitor through the winding.

2. Background of the Invention

It is known in the art to use AC motors in vehicles such as automobiles, trucks and the like. Kinoshita in U.S. Pat. No. 5,629,603 discloses using an AC motor from a battery coupled to an inverter. Phase windings are connected to a triple pole contactor that is used to charge the battery. Young in U.S. Pat. No. 5,889,428 teaches a low-loss regulated charge pump with integrated ferroelectric capacitors. Grand in U.S. Published Application 2008/0169138 discloses an inverter that converts DC battery power to AC power. Multiple battery packs supply power to the vehicle. An AC motor is run from the AC power produced. U.S. Pat. Nos. 4,780,619 and 4,947,053 teach using transformers to produce 3-phase power for an AC 3-phase motor in a vehicle. U.S. Pat. No. 5,831,409 discloses using a 3-phase motor with two identical sets of windings.

It would be very desirable to be able to directly use stock 3-phase AC motors in vehicles. Such motors deliver considerable power and can be supplied in different sizes. Such motors have large torques at low RPMs and generally can run continuously at high RPM (around 3400 RPM for a typical 60 Hz motor). Speed can be controlled by adjusting drive frequency and by disabling one or more of the phases after the motor reaches a certain RPM.

Prior art systems have used expensive transformers or electronic drivers to achieve 3-phase power. It would be advantageous to be able to use 3-phase AC motors in vehicles without transformers or expensive drivers.

SUMMARY OF THE INVENTION

The present invention relates to a system and apparatus that allows the use of a 3-phase AC motor in a vehicle by associating a series capacitor with each phase winding. The capacitor can be charged through the motor winding and then switched to discharge through the winding in a resonant oscillatory mode. The capacitor values can be chosen so that the winding and capacitor in series resonates at approximately 60 Hz. Oscillations in each phase can be staggered by around 120 degrees. The charging and discharging is controlled by electronic SPDT switches that switch around 300 VAC/500 VDC at around 15 amps for each phase. With an average DC current of 20 amps from a 48 volt battery pack (four 12 volt batteries connected in series) and 75% discharge of the capacitors, the present invention can run a 7.5 HP, 3-phase, 240 VAC motor for approximately 3.5 hours or longer. A simple oscillator circuit can drive the switches in sequence.

DESCRIPTION OF THE FIGURES

Attention is now directed to several illustrations.

Several drawings and illustrations have been provided to aid in understanding the present invention. The scope of the present invention is not limited to what is shown in the figures.

DESCRIPTION OF THE INVENTION

The present invention relates to running a 3-phase AC motor in a vehicle without a transformer or expensive driver module. A typical example might be a 7.5 H.P., 3-phase, 240 VAC motor using a 50V to 300V voltage multiplier, four 12V, 100 AH batteries and a simple oscillator and control circuit. It should be noted that any H.P. motor may be used as well as any voltages. While this size is preferred, any multi-phase motor running at any voltage or current is within the scope of the present invention.

Figure 1:
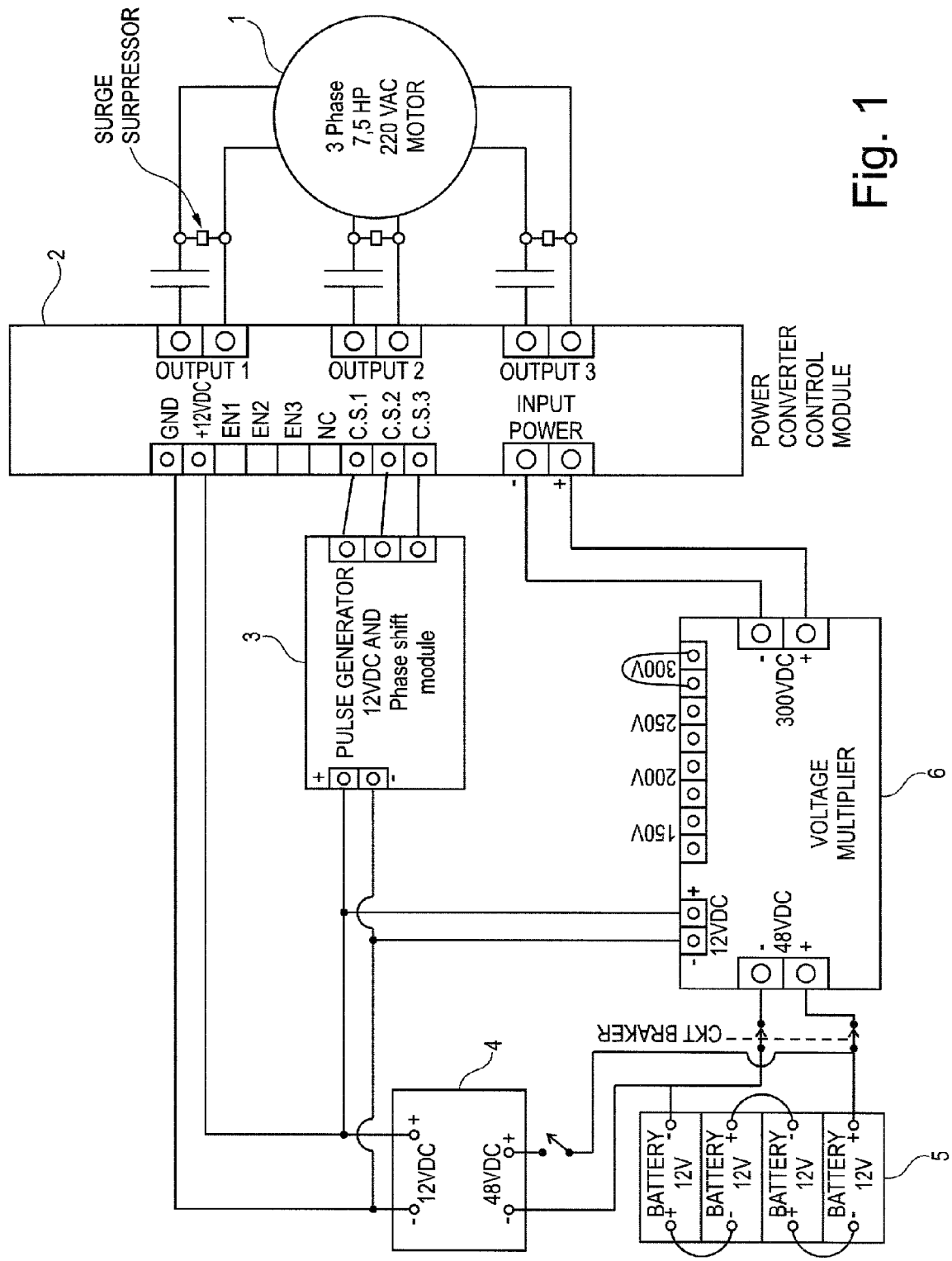
FIG. 1 is a block diagram of a complete motor driving system.

Turning to FIG. 1, a block diagram of an embodiment of the present invention can be seen. A bank of four 12 volt batteries 5 can be seen. Typical values are 100 AH batteries; however, any AH ratings may be used with greater or lesser time durations between recharging intervals. The batteries 5 are tied to a 12 volt supply 4 that can be generally purchased off-the-shelf. This supply 4 provides 12 volts to logic and switch circuitry. While 12 volts is the preferred voltage, any other voltage such as 5 volts may be used. Any control voltage is within the scope of the present invention. In fact, the control voltage can come from one of the batteries in the pack used alone.

The 48 volt output of the 4-battery pack is also tied to the input of a voltage multiplier 6. This voltage multiplier 6 converts 48 VDC to around 300 VDC. Again, different input and output voltages may be chosen with these being preferred. The voltage multiplier 6 can have an optional jumper (or otherwise) selected voltage output. The high voltage DC output of the voltage multiplier is tied to the power input of a power control module 2.

A pulse generator drive circuit 3 is used to drive the power control module 6 at a particular frequency (preferably around 60 Hz). The power control module 2 has three outputs, one for each motor phase. Each output is tied into a capacitor in series with one of the motor windings. Again, a 3-phase, 7.5 H.P. 220 VAC motor 1 is shown; however, as stated, any multi-phase AC motor is within the scope of the present invention. A surge suppressor 10 can be used on each phase to prevent high voltage inductive surges across the transistor switches. Each motor phase can be driven in 120 degrees phase relation to any other phase.

Figure 2:
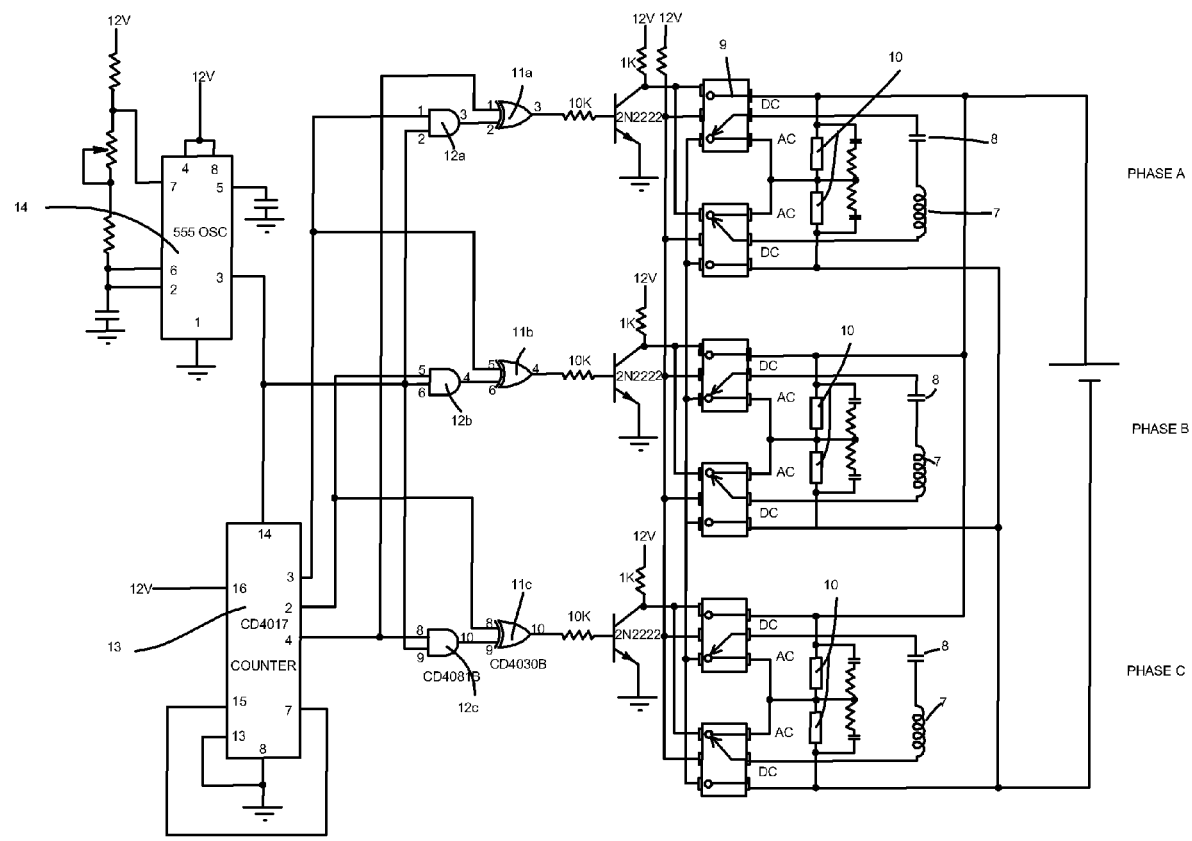
FIG. 2 is a schematic diagram of an oscillator, switches, switch drivers and capacitor charge/discharge units driving a 3-phase motor.

Turning to FIG. 2, a schematic of a pulse generator 3 is shown along with the motor capacitors and an example of some possible tuned frequencies. A 555 oscillator 14, known in the art, is shown on the left of FIG. 2. This circuit puts out an approximate square wave at a particular frequency. This signal can be applied to a divide by 3 counter 13 (like a CD4017 known in the art) an then to a set of AND gates 12a, 12b, 12c (like a CD4081 known in the art) followed by a set of Exclusive OR gates 11a, 11b, 11c (like a CD4030 known in the art) to apply a square wave to the bases of three 2N2222 NPN power transistors that are used to drive a set of electronic switches 9, two switches for each motor phase. The 2N2222 transistors are thus driven at the correct phases for the 3-phase motor. While 2N2222 transistors, a 555 oscillator, a CD4017 counter, a CD4081 AND gate and CD4030 EXOR gate is shown, any logic elements that perform similar functions may be used and are within the scope of the present invention. The 555 oscillator, counter and logic steering module (the gates 11, 12) can be driven at a rate that allows adequate time for capacitor charging and discharging. Under heavy motor loading, the damping of the resonate sinusoidal wave when the switches are in AC mode will be heavy. It is typically necessary to drive the switches once every cycle to achieve continuous operation. In the case of driving the motor every cycle, the center element of the electronic switches will toggle between the output pole elements (DC) and the inner pole elements (AC) at approximately 60 Hz. In this case, the 555 oscillator frequency will be around 180 Hz. In very lightly loaded conditions, it is possible with some motors to drive the circuit every two or more cycles instead of every cycle.

As stated, each motor phase winding 7 is connected in series with a capacitor 8. Each end of this series capacitor/winding circuit is tied into the center of the electronic switch. Each capacitor/winding connection has a free capacitor end and a free winding end tied to the electronic switch groups 9. While bipolar switching transistors have been shown to drive the electronic switch groups 9 any type of electronic switch can be used. A surge suppresser and R-C noise an arc suppresser can also be optionally used on the output of the control module on each phase.

High voltage DC (around 300 VDC) is applied to the outer poles of each switch group 9. The inner poles are tied together to complete the switch group and form a closed resonant circuit. When the switches are in the DC position (opposite to what is shown in FIG. 2), the capacitor charges through the motor winding. When the switches are changed to the positions shown in FIG. 2, that particular winding and capacitor form a closed resonant circuit that begins to ring or oscillate (or at least to decay). The capacitors are chosen so that the natural ring frequency of the capacitor-winding is around 60 Hz. As stated, in heavy loading conditions, the damping may be such that the winding needs to be driven (capacitor charged) every cycle.

The present invention functions by periodically switching to the DC state to allow a capacitor to charge, and then switching to the AC state to allow the resonant circuit to oscillate through the motor winding. The timing of the switching are typically phase staggered to cause the oscillations to be around 120 degrees out of phase with each other—running the 3-phase motor in a 3-phase mode as though it were connected to a 3-phase AC source.

Since each motor winding and each capacitor is slightly different, the resonant frequencies may be slightly different from each other and a little different from 60 Hz. As long as the deviation is not too severe, the motor will run. In a particular test case, 1000 uF, non-polarized capacitors 8 were used that tuned the windings to 74.6 Hz, 73.7 Hz and 73.8 Hz respectively on the three different windings 7 of the same motor. This means that the motor windings in this particular test case had inductances of approximately 4.5516 mH, 4.6634 mH and 4.6508 mH (assuming that each capacitor was exactly 1000 uF). The motor windings also were found to have a DC resistance of around 5 ohms each. It should be noted that these numbers are given as an example. Different motors will have different values of inductance, resistance and hence different resonant frequencies. While, in principle, one could add more capacitance to achieve a resonance frequency of 60 Hz. However, commercial capacitors usually have a wide tolerance range, and the motors will work over a wide range of frequencies in the heavily damped mode. Frequencies this close to 60 Hz will work entirely satisfactorily. 1000 uF capacitors charging through approximately 5 ohms have a time constant of around 5 mS. That means they will be charged over 80% in around 15 mS. The value used in FIG. 2 was 13.5 mS. The resonant circuit with 5 ohms in series will damp in approximately the same time; however, heavy motor loading will cause a faster damping since electrical energy is being converted to mechanical. Hence a 10-15 mS pulse rate can be used to drive the switches once each cycle. This will lead to a charge of around 75-85%. Switching times and phases should be chosen based on the winding resistance, motor loading with enough time to allow charging and damping. The preferred discharge is to about 75%.

Figure 3:
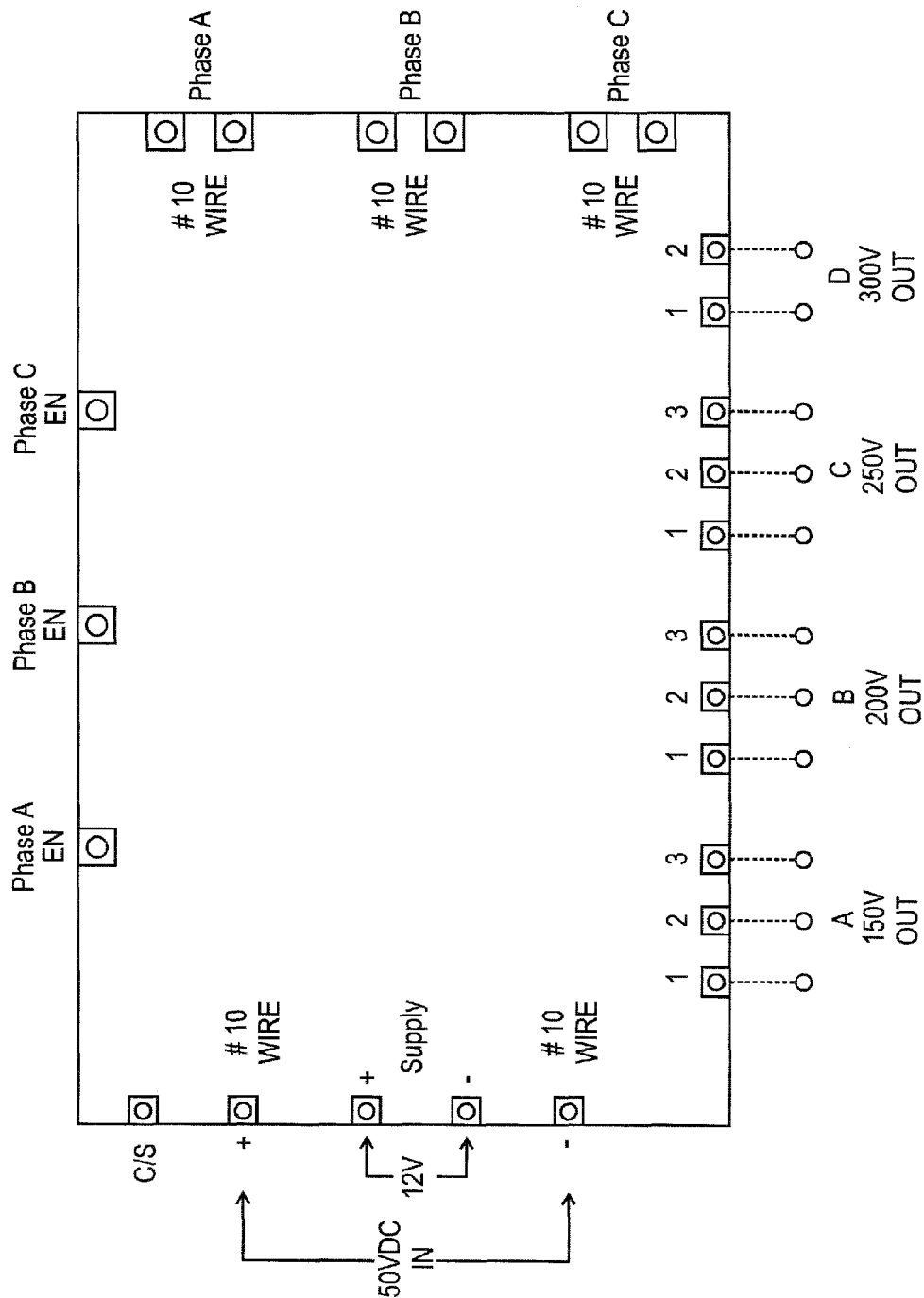
FIG. 3 is a block diagram of a possible control module outline.

FIG. 3 shows a block diagram of a possible control module 2. 12 VDC and 48-50 VDC enter through several supply pins. Motor phases (and capacitors) are connected to outputs Phase A, Phase B and Phase C. The various phases can be enabled or disabled using the EN control inputs. Disabling of phases can be accomplished using additional power transistors in series with the high power driver transistors, or by logically disabling the AND gates driving a particular phase. Optional voltage outputs of 150 VDC, 200 VDC, 250 VDC and 300 VDC can be provided if desired. The unit shown in FIG. 4 is simply an example; many different pin arrangements and pin functions can be used. As stated, different pulse repetition rates may optionally be used with some motors in lighter motor loading conditions where the capacitor may only be charged every other cycle or every several cycles.

When the arrangement of the present invention is used in a car, a preferred transmission is a transmission that will accept a fairly constant RPM input and convert between torque and speed such as a hydrostatic transmission for example. Overall speed control of the vehicle can be maintained by controlling the transmission, switching phases in and out and by turning off the motor completely. Batteries can be recharged at night or between driving intervals by methods known in the art. In the case of a hybrid vehicle, a small gasoline or propane engine (or any other engine) could be used to partially or totally charge the batteries.

Several descriptions and illustrations have been presented to explain the features of the present invention. One with skill in the art will realize that numerous changes and variations can be made without departing from the spirit of the invention. Each of these changes and variations is within the scope of the present invention.

I claim:

1. A method of using an 3-phase AC motor in a vehicle comprising:
    wiring a separate capacitor in series with each phase winding of a 3-phase motor resulting in a free capacitor end and a free winding end;
    attaching said free winding end for each phase into a center contact of a first SPDT switch for each winding;
    attaching said free capacitor end for each phase into a center contact of a second SPDT switch for each winding;
    attaching a high DC voltage across outer pole contacts of said first and second SPDT switch for each winding;
    directly coupling together inner pole contacts of said first and second SPDT switch for each winding; wherein, in a first switched position, said first and second SPDT switches connect said free capacitor end and said free winding end to said high DC voltage, and in a second switched position, said first and second SPDT switches connect said free capacitor end and said free winding end together forming a resonant circuit;
    switching said center contacts for each of said phases from said first switched position to said second switched position at a predetermined periodic rate; wherein, said phases are switched in a 3-phase sequence.

2. The method of claim 1 wherein said high DC voltage is around 300 volts.

3. The method of claim 1 wherein said capacitors have a value of around 1000 uF.

4. The method of claim 1 wherein said capacitors are charged for around 10-15 mS.

5. The method of claim 1 wherein said high DC voltage is produced by a voltage multiplier from a bank of 12 VDC vehicle batteries.

6. The method of claim 1 wherein one or two of said phases can be disabled.

7. The method of claim 1 wherein said motor is a 3-phase, 7.5 H.P. 220 AC motor.

8. An apparatus for running a 3-phase AC motor from DC power in a vehicle comprising:
   an oscillator;
   a divider;
   three power driver transistors;
   a logic steering module, said oscillator driving said divider to provide electrical signals into said logic steering module, wherein said logic steering module provides 3-phase drive signals to said power driver transistors;
   said power driver transistors toggling three power switch groups, each switch group including two SPDT electronic switches, each electronic switch having a center element, an inner pole element and an outer pole element;
   wherein center elements of the two switches in each of said power switch groups is electrically coupled to opposite ends of a series circuit containing a capacitor and a motor winding of a 3-phase motor; and
   wherein the outer pole element of the two switches in each of said power switch groups is electrically coupled to a DC power source; and
   wherein the inner pole element of the two switches of each of said power switch groups is electrically coupled together;
   wherein, in a first switch toggle position, said power switch groups allow said capacitor to charge through said motor winding, and in a second switch toggle position, said power switch groups allow said capacitor and winding to oscillate in resonance, said oscillation forcing damped sinusoidal electrical current through each of said motor windings, said damped sinusoidal current in each of said windings being around 120 degrees out of phase with current in each other of said windings, said sinusoidal current causing the motor to rotate.

9. The apparatus of claim 8 wherein said oscillator oscillates at around 180 Hz.

10. The apparatus of claim 8 wherein said motor is a 3-phase, 7.5 H.P. 220 AC motor.

11. The apparatus of claim 8 wherein said logic steering module contains AND gates and exclusive OR gates.

12. The apparatus of claim 8 wherein each of said capacitors is around 1000 uF.

13. The apparatus of claim 8 wherein said DC power has a voltage around 300 volts.

14. The apparatus of claim 8 wherein one or two of said phases can be disabled.

* * * * *